(12) United States Patent
Rennie

(10) Patent No.: US 12,296,988 B2
(45) Date of Patent: May 13, 2025

(54) PLASMA REACTOR

(71) Applicant: Scott Hughan Rennie, Machrihanish (GB)

(72) Inventor: Scott Hughan Rennie, Machrihanish (GB)

( * ) Notice: Subject to any disclaimer, the term of this patent is extended or adjusted under 35 U.S.C. 154(b) by 75 days.

(21) Appl. No.: 18/035,628

(22) PCT Filed: Sep. 16, 2021

(86) PCT No.: PCT/AU2021/051068
§ 371 (c)(1),
(2) Date: May 5, 2023

(87) PCT Pub. No.: WO2022/104408
PCT Pub. Date: May 27, 2022

(65) Prior Publication Data
US 2024/0010363 A1    Jan. 11, 2024

(30) Foreign Application Priority Data

Nov. 18, 2020  (AU) ................. 2020904250

(51) Int. Cl.
*F03H 1/00* (2006.01)
*B64G 1/40* (2006.01)
*H05H 1/06* (2006.01)

(52) U.S. Cl.
CPC ........... *B64G 1/413* (2023.08); *F03H 1/0081* (2013.01); *H05H 1/06* (2013.01)

(58) Field of Classification Search
None
See application file for complete search history.

(56) References Cited

U.S. PATENT DOCUMENTS 3,318,094 A    5/1967  Koller
4,023,065 A    5/1977  Koloc
(Continued)

FOREIGN PATENT DOCUMENTS

WO    2006/096772 A2    9/2006
WO    2020/176348 A2    9/2020

OTHER PUBLICATIONS

PCT/AU2021/051068 International Search Report and Written Opinion dated Oct. 8, 2021.

*Primary Examiner* — Arun Goyal
*Assistant Examiner* — William L Breazeal
(74) *Attorney, Agent, or Firm* — Michael Best & Friedrich LLP

(57) ABSTRACT

A plasma reactor is provided together with a method for generating kinetic energy to propel a craft. The reactor includes an inlet for plasma; a reactor core having an interior chamber and an exterior chamber, the interior chamber being configured to rotate within the exterior chamber; a pair of opposing polar field generators, a first polar field generator connected proximal to an inlet of the interior chamber, and a second polar field generator connected proximal to an outlet of the interior chamber, the pair of polar field generators configured to induce a current in the plasma to generate a toroidal flow therein, wherein the toroidal flow compresses the plasma into a z-pinch flow in a central column between the first polar field generator and the second polar field generator; turbine blades located between the interior chamber and the exterior chamber for generating thrust to convert the z-pinch flow to kinetic energy; and an outlet.

16 Claims, 2 Drawing Sheets

(56) References Cited

U.S. PATENT DOCUMENTS

| 4,330,864 | A  | 5/1982  | Ohyabu |
|---|---|---|---|
| 4,543,231 | A  | 9/1985  | Ohkawa |
| 2001/0046273 | A1 | 11/2001 | Koloc |
| 2007/0206714 | A1* | 9/2007 | Conceicao ............... G21B 1/23 |
| | | | 376/100 |
| 2014/0023170 | A1 | 1/2014 | Slough |
| 2018/0220519 | A1 | 8/2018 | Grossnickle et al. |
| 2018/0223815 | A1 | 8/2018 | Anderson et al. |

* cited by examiner

PLASMA REACTOR

This application claims priority from Australian provisional patent application No. 2020904250 filed on 18 Nov. 2020.

TECHNICAL FIELD

The present invention relates to systems and methods for generating energy. In particular, the present invention provides an improved system and method for generating kinetic and potential energy for propelling a craft.

BACKGROUND OF INVENTION

The reality of interplanetary travel is limited, amongst other things, by the capacity to produce sufficient propulsive power to enable the significant velocity changes requisite travel between planets. This is complicated by the need to overcome gravitational effects. As a result, the fuel requirements of space craft are significant. The significant fuel requirement is compounded by the need to launch the fuel required along with the payload of the craft, which increases the amount of fuel required. As a consequence, various technologies have been proposed to both reduce the amount of fuel required to fuel a space craft for its interplanetary journey and to improve fuel economy.

The development of more sustainable means of generating electrical energy is particularly attractive for the purposes of interplanetary travel.

Nuclear power is recognised as one option for sustainable energy generation. Nuclear fission is the splitting of a large nucleus into two or more smaller nuclei and nuclear fusion is the binding of two or more small nuclei to form a larger nucleus. The energy released by these reactions is the difference in binding energies between the reactants and the products.

To date, space craft have relied on thermal energy from heavy nuclear fission fuels or solar panels to provide electrical power, limiting their capacity to operate a distance far from the sun, and also limiting their peak acceleration due to the mass of the electric power source. Attempts at using plasma to propel space craft include ion engines, which generate plasma and use that plasma for propulsion. However, such ion engines do not have any rapid expansion force and are driven solely on low density plasma that creates electrostatic interactions. Consequentially, they are very slow to build up speed and must be powered by larger sources of power than mentioned above.

Compared with nuclear fission, nuclear fusion reactions creates significantly less harmful nuclear waste. Nuclear fusion also has the potential to provide more output energy for a given weight of fuel than any fuel-consuming energy source currently in use. For example, previous attempts at generating energy from z-pinch plasma have focused on compressing plasma to the point of fusion between atoms to generate heat to turn a steam turbine. However, nuclear fusion reactors are not currently commercially viable since they require vast quantities of input energy and consume more energy than is output.

Accordingly, there remains, however, a need for improved, sustainable energy generation for powering interplanetary travel.

A reference herein to a patent document or any other matter identified as prior art, is not to be taken as an admission that the document or other matter was known or that the information it contains was part of the common general knowledge as at the priority date of any of the claims.

SUMMARY OF INVENTION

According to an aspect of the present invention, there is provided a plasma reactor for generating kinetic energy to propel a craft, the reactor including: an inlet for plasma; a reactor core having an interior chamber and an exterior chamber, the interior chamber being configured to rotate within the exterior chamber; a pair of opposing polar field generators, a first polar field generator connected proximal to an inlet of the interior chamber, and a second polar field generator connected proximal to an outlet of the interior chamber, the pair of polar field generators configured to induce a current in the plasma to generate a toroidal flow therein, wherein the toroidal flow compresses the plasma into a z-pinch flow in a central column between the first polar field generator and the second polar field generator; turbine blades located between the interior chamber and the exterior chamber for generating thrust to convert the z-pinch flow to kinetic energy; and, an outlet.

In certain embodiments, the outlet comprises an output shaft. For example, a generator may be connected to the output shaft to convert rotational energy provided by the z-pinch flow into electrical energy.

In other embodiments, the outlet provides for release of plasma. For example, the released plasma is used as a propellant to provide a direct source of propulsion to the craft.

In some embodiments, the first and second polar field generators are configured such that a magnetic wave associated with each of the first and second polar field generators rotates in the same direction.

The first polar field generator may comprise an armature inlet pole and the second polar field generator may comprise an armature outlet pole. According to some embodiments, currents induced in a first magnetic wave associated with the armature inlet pole and a second magnetic wave associated with the armature outlet pole flow in the same direction such that the first and second magnetic waves interlock in the z-pinch flow to be compressed by the toroidal flow.

The first and second polar field generators may be configured so as to concentrate the induced current around the toroidal flow resulting in a helical toroidal flow around a centre which compresses the z-pinch flow.

In one particular embodiment, concentrating the induced current around the toroidal flow in a helical manner is achieved by providing one or more permanent magnets in each of the armature inlet pole and the armature outlet pole.

In another embodiment, concentrating the induced current around the toroidal flow in a helical manner is achieved by providing one or more electrical coils in each of the armature inlet pole and the armature outlet pole.

According to another aspect of the present invention, there is provided a method for generating kinetic energy to propel a craft using a plasma reactor, the method including the following steps: adding plasma to a reactor core, the reactor core having an interior chamber and an exterior chamber and being configured to rotate within the exterior chamber; inducing a current in the plasma using a pair of opposing polar field generators, a first polar field generator being connected proximal to an inlet of the interior chamber, and a second polar field generator being connected proximal to an outlet of the interior chamber, wherein inducing a current in the plasma generates a toroidal flow therein and the toroidal flow compresses the plasma into a z-pinch flow in a central column between the first polar field generator and the second polar field generator; and directing the z-pinch flow towards turbine blades located between the interior chamber and the exterior chamber to convert the z-pinch flow to kinetic energy.

The method may further include the step of connecting a generator to an output shaft associated with an outlet of the reactor core to convert kinetic energy provided by the turbine blades into electrical energy.

In alternate embodiments, the method further includes the step of releasing plasma from the reactor core as a propellant to provide a direct source of propulsion to the craft.

Currents may be induced from a first magnetic wave associated with the first polar field generator and a second magnetic wave associated with the second polar field generator such that the magnetic wave rotates in the same direction such that the first and second magnetic waves interlock in the z-pinch flow to be compressed by the toroidal flow.

The first and second polar field generators may be configured so as to concentrate the induced current around the toroidal flow in a helical manner to maintain the toroidal flow around the centre of the z-pinch flow.

BRIEF DESCRIPTION OF DRAWINGS

The accompanying figures together with the detailed description below, are incorporated in and form part of the specification, and serve to further illustrate embodiments of concepts that include the claimed invention, and explain various principles and advantages of those embodiments.

A person skilled in the art will appreciate that elements in the figures are illustrated for simplicity and clarity and have not necessarily been drawn to scale. It will further be appreciated that the drawings may show only those specific details that are pertinent to understanding the embodiments of the present invention so as not to obscure the disclosure with details that will be readily apparent to those of ordinary skill in the art having the benefit of the description below.

DETAILED DESCRIPTION

Figure 1:
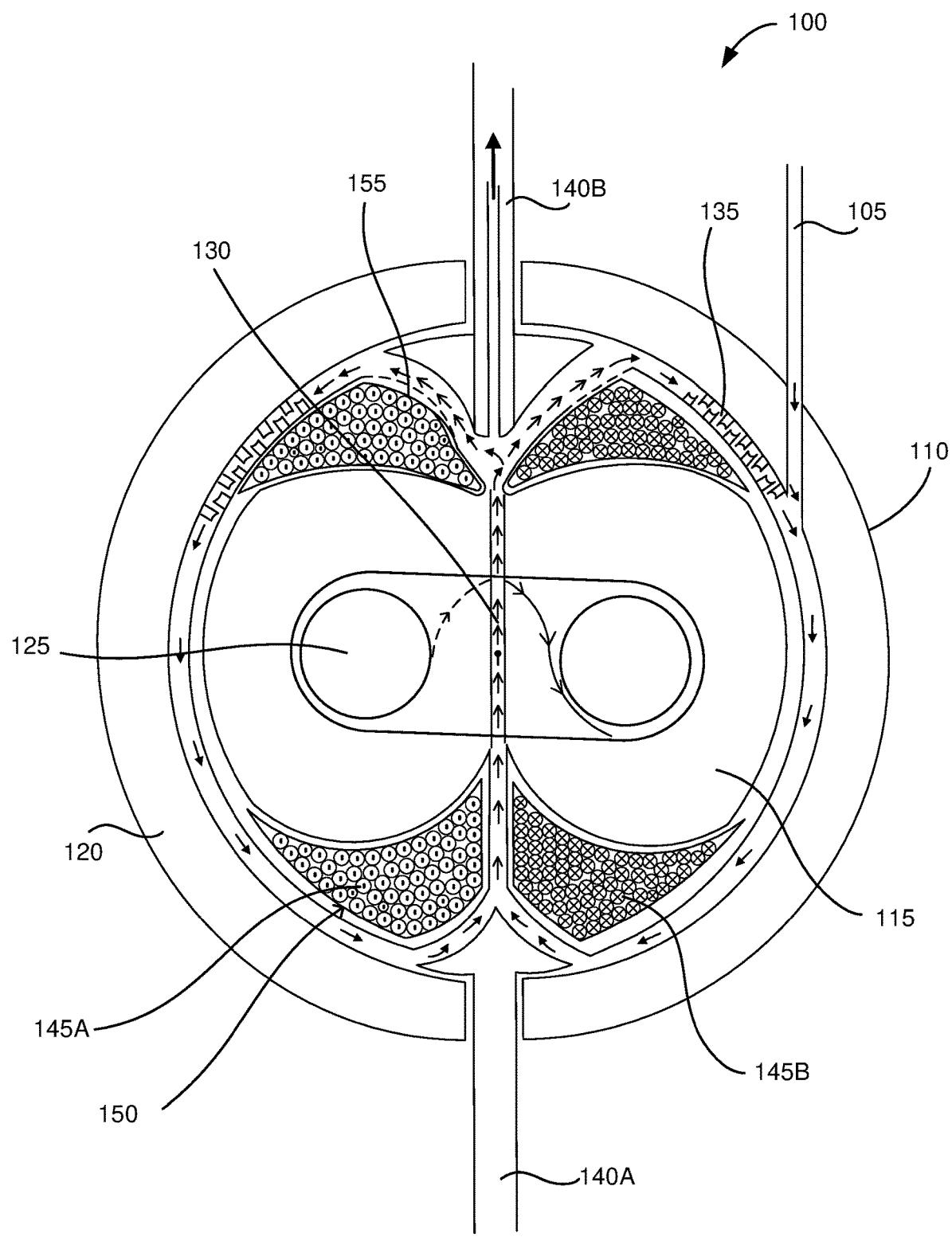
FIG. 1 is a planar section through the plasma reactor showing the components situated therein according to an embodiment of the invention.

Referring firstly to FIG. 1, there is shown a planar section through the plasma reactor 100 for generating kinetic energy to propel a craft (not shown) in accordance with an embodiment of the invention. An inlet 105 for intake of plasma into the reactor 100 is provided. The reactor 100 includes a reactor core 110 having an interior chamber 115 and an exterior chamber 120. The interior chamber 115 is configured so as to rotate within the exterior chamber 120. This enables the potential energy stored within the plasma to be converted to kinetic energy.

The interior chamber 115 includes a pair of opposing polar field generators. A first polar field generator 150 which is connected proximal to an inlet of the interior chamber 115 and a second polar field generator 155 which is connected proximal to an outlet of the interior chamber, comprising the pair of opposing polar field generators, are configured to induce a current within the plasma circulating inside the interior chamber 115 to generate a toroidal flow 125 in the plasma. The polar field generators could, for example, take the form of an electrical coil or a permanent magnet. The toroidal flow 125 compresses the circulating plasma into a z-pinch flow 130 (see also FIG. 2). The z-pinch flow 130 forms a central column between the first polar field generator 150 and the second polar field generator 155.

Turbine blades 135 are provided between the interior chamber 115 and the exterior chamber 120. The turbine blades 135 provide rotational speed to the interior chamber 115. The turbine blades 135 may be positioned anywhere between the interior chamber 115 and the exterior chamber 120 and at any size and spacing depending on the torque and speed requirements of the individual reactor 100 and the load connected to the output shaft 140A. Turbine blades 135 can be fixed or variable pitch depending on the speed requirements of the reactor core 110 and the load attached. For example, a fixed sets of blades may be provided on the outside of interior chamber 115 with optional variable pitch blades attached to the interior of the exterior stationary chamber 120 for speed and torque control of output shaft 140A.

The z-pinch flow 130 is directed towards the turbine blades 135 to generate thrust to rotate the inner chamber 115 within the outer chamber 120 to convert the potential energy stored in plasma from compression in the z-pinch flow into kinetic energy. An outlet 140 is provided. The outlet 140 may take the form of an output shaft 140A, for example such that a generator can be connected to the output shaft to convert the kinetic energy provided by the z-pinch flow 130 into electrical energy. In alternate embodiments, an alternate outlet 140B provides for release of rapidly expanding plasma as a source of direct propulsion to a craft.

The first polar field generators 150 may comprise an armature inlet pole and the second polar field generator 155 comprises an armature outlet pole.

In FIG. 1 the direction of plasma flow within the reactor 100 is shown by arrows between the interior chamber 115 and the exterior chamber 120. The magnetic waves produced by plasma flowing around the toroidal flow 125 in a helical manner compressing the plasma flowing through the centre of the armature inlet 105 forming the z-pinch flow 130. The polar field generators 150, 155 are shown in FIG. 1 with current inward flow 145A represented by a cross inside the circle, while current outward flow 145B out is represented by a dot inside the circle.

Figure 2:
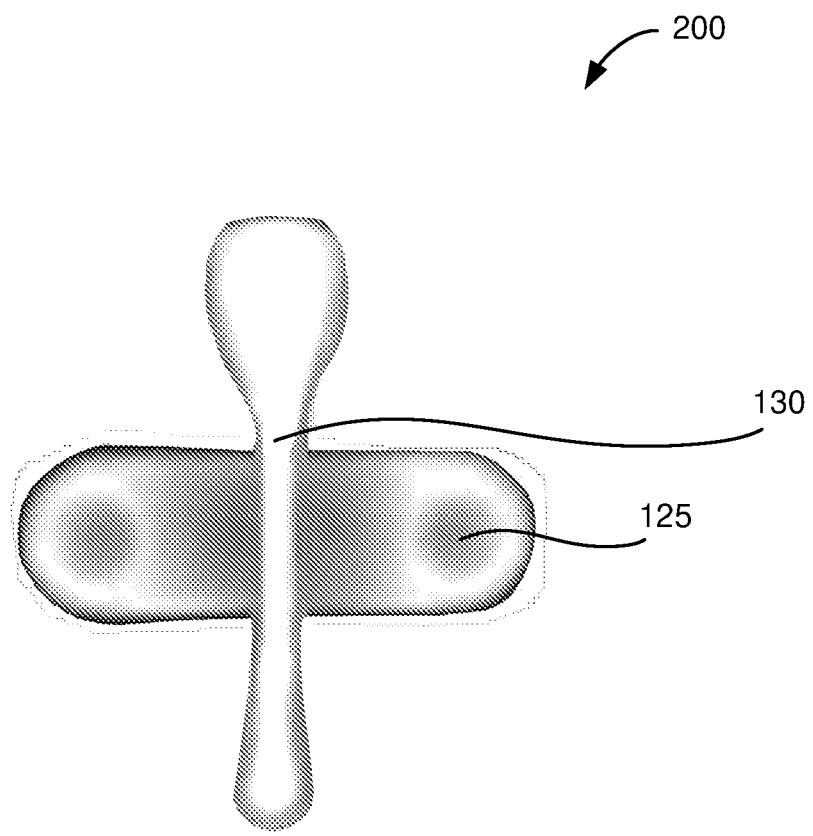
FIG. 2 shows a schematic z-pinch plasma flow which forms in the plasma reactor of FIG. 1.

Referring now to FIG. 2, there is shown the z-pinch plasma flow 130, also referred to as the plasma "squatter man" 200. According to an embodiment of the present invention, the z-pinch flow 130 is generated within the interior chamber 115 shown in FIG. 1 by compression of the plasma flow by magnetic waves generated by the toroidal flow 125. As the plasma flow enters the armature outlet pole 155, it expands as a result of interactions with the circulating plasma and no longer being under the influence of the z-pinch. From here the plasma is forced to flow around the outside of the armature outlet pole 155 and its rapid release of potential energy is converted to kinetic energy causing the interior chamber 115 of the reactor 100 to rotate using alternating turbine blades 135 provided between the interior chamber and exterior chamber 120. The circulating plasma is subsequently fed back to the inlet of the interior chamber or armature 105, also referred to as a feeder pole, to complete the circuit and provide continuously flowing plasma to the reactor core 110. The feeder pole 105 is referred to as such since it's role is to organise the plasma into laminar flow to create a vortex in the plasma flowing to the z-pinch 130. The plasma flow becomes accelerated as it passes inside the reactor core 110 to be compressed in the z-pinch flow 130 as previously described.

Referring back to FIG. 1, the armature inlet pole 150 and the armature outlet pole are situated around the top and bottom oppositely facing portions of the interior chamber 115. It will be understood that both top and bottom currents must flow in the same direction to enable the interlocking magnetic wave to create the helical toroidal plasma flow 125. Therefore the polar field generators 150,155 are configured such that a magnetic wave or polar field associated with each of the polar field generator 150, 155 will rotate in the same direction. Consequently, currents induced from the magnetic wave associated with the armature inlet pole 150 and another magnetic wave associated with the armature outlet pole 155, will flow in the same direction such that the magnetic waves interlock to be compressed by the toroidal flow 125 forming the z-pinch flow 130.

The polar field generators 150, 155 are configured to concentrate the induced current around the toroidal flow 125 in a helical manner to maintain a stable toroidal flow around a centre of the z-pinch flow 130. In some embodiments, this effect is achieved by providing one or more permanent magnets in each of the armature inlet pole and the armature outlet pole. In other embodiments, concentrating the induced current around the toroidal flow in a helical manner is achieved by providing one or more electrical coils in each of the armature inlet pole and the armature outlet pole. The magnetic waves from the toroidal flow 125 compress the induced waves that emanate from the polar fields to create the z-pinch flow 130. This causes a consequent increase in the density and speed of the plasma flowing through the centre of the z-pinch 130. The high speed plasma flow is directed through the top polar region, i.e. proximal the armature outlet pole 155 before being directed to external turbine blades and other propulsion systems.

The toroidal flows around the toroid in a helical trajectory inside the plasma reactor. The helical trajectory produces magnetic waves, each magnetic wave having a helical trajectory that is opposed to the particle that created it. The energy of the magnetic wave having a helical trajectory is passed onto the preceding plasma particle and consequentially continually causes the plasma to flow around the toroid. When two opposing magnetic waves (also referred to as gravitational waves and electron waves) on either side of the toroid meet in the centre column, they act to compress the plasma and produce a plasma current, commonly referred to as the z-pinch flow.

Previous attempts at generating energy from z-pinch plasma flows have focused their efforts on compressing the plasma to the point of fusion between atoms to generate heat to turn a steam turbine. In the approach conceived by the present invention, the potential energy stored in the plasma itself is converted to a more useable form. When that plasma is forced to change direction on exiting the z-pinch flow 130 it expands as it travels towards the collision point, i.e. provided by the turbine blades 135 located between the interior chamber 115 and the exterior chamber 120 of the reactor 100. The potential energy of the plasma is thereby conveniently converted to kinetic energy.

In regard to reactor construction, it will be appreciated that in the case of a comparatively small reactor, which would have sufficiently low heat transfer in the turbine blade section, efficiency would be enhanced if the exterior surface of the reactor core were composed of an electrically insulated material such as a ceramic or a composite material. This should reduce any drag caused by eddy currents induced in the wall of the reactor core. However, in the case of a large reactor, the temperatures produced by these eddy currents can optionally be utilised to provide a source of heating for the craft. Eddy currents can be limited by forming the exterior chamber of metals such as titanium, tungsten, iron or any of its alloys, copper, aluminium, etc. Such segments may be insulated from each other and then laminated together to limit the path of current generated from induction.

The interior chamber 115 of the reactor may be formed of a ferromagnetic material. In some embodiments, the interior chamber 115 is formed of a laminated type construction having insulation disposed between each layer. It will be understood that the materials used to construct the interior chamber should have a good strength to weight ratio, similarly to the materials and metals used to form the exterior chamber 120.

The plasma reactor 100 of the present invention differs from standard tokomak reactors which use extremely high powered conductors wound together in a helical toroidal pattern. These highly powered conductors are used to compress the plasma into a torus. These known reactors have poloidal conductors as well as intermediate coils to conduct specific tasks within the plasma flow. These conductors are stationary within the reactor and the plasma flow is maintained off the walls of the reactor by the magnetic field produced in the coils wrapped around the reactor. In contrast, the plasma reactor of the present invention utilises permanent magnets or high power electrical conductors wound in the poloidal direction relevant to the toroidal plasma flow. The toroidal flow is able to self-excite between opposing polar fields. As the reactor builds speed the toroidal flow starts to compress the z-pinch which is utilised to extract the pressure gradient as it flows from one pole to the other. These poloidal conductor coils require much less input energy to imitate the conversion of potential energy to kinetic energy since they are not required to create fusion as in known plasma reactors and there is no need to transfer heat energy from plasma to water to create steam, or similar, thereby considerably simplifying the process of generating energy. No other plasma reactor has moving parts or uses the plasma itself as an agent to move parts of the reactor core as provided by the present invention.

The reactor can also serve as a "magnetic field" for a craft that can create a bow shock thus protecting the craft and reactor from high energy cosmic rays and atomic particle bombardment, an inherent problem with known reactors as similar particle bombardment from fusion and fission destroys the reactor core in the process of generating heat. The reactor of the present invention is also capable of levitation if certain conditions are met, as seen with any superconductor material placed in proximity to a strong enough magnetic field. Thus reducing the overall weight of the reactor and/or craft in comparison to known designs with a similar energy output.

Where any or all of the terms "comprise", "comprises", "comprised" or "comprising" are used in this specification (including the claims), they are to be interpreted as specifying the presence of the stated features, integers, steps or components, but not precluding the presence of one or more other features, integers, steps or components.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A plasma reactor for generating kinetic energy to propel a craft, the plasma reactor including:
   (a) a reactor inlet for plasma;
   (b) a reactor core having an interior chamber and an exterior chamber, the interior chamber being configured to rotate within the exterior chamber;
   (c) a pair of opposing polar field generators, a first polar field generator of the pair of opposing polar field generators connected proximal to a chamber inlet of the interior chamber, and a second polar field generator of the pair of opposing polar field generators connected proximal to an outlet of the interior chamber, the pair of opposing polar field generators configured to induce a current in the plasma to generate a toroidal flow therein, wherein the toroidal flow compresses the plasma into a z-pinch flow in a central column between the first polar field generator of the pair of opposing polar field generators and the second polar field generator of the pair of opposing polar field generators;
   (d) turbine blades located between the interior chamber and the exterior chamber for generating thrust to convert the z-pinch flow to kinetic energy; and
   (e) an outlet.

2. The plasma reactor according to claim 1, wherein the outlet comprises an output shaft.

3. The plasma reactor according to claim 2, wherein an electrical generator is connected to the output shaft to convert rotational energy provided by the z-pinch flow into electrical energy.

4. The plasma reactor according to claim 1, wherein the outlet provides for release of the plasma to thereby provide released plasma.

5. The plasma reactor according to claim 4, wherein the released plasma is used as a propellant to provide a direct source of propulsion to the craft.

6. The plasma reactor according to claim 1, wherein the pair of opposing polar field generators are configured such that a magnetic wave associated with each polar field generator of the pair of opposing polar field generators rotates in a same direction.

7. The plasma reactor according to claim 1, wherein the first polar field generator of the pair of opposing polar field generators comprises an armature inlet pole and the second polar field generator of the pair of opposing polar field generators comprises an armature outlet pole.

8. The plasma reactor according to claim 7, wherein currents induced a first magnetic wave associated with the armature inlet pole and a second magnetic wave associated with the armature outlet pole flow in the same direction such that the first magnetic wave and the second magnetic wave interlock in the z-pinch flow to be compressed by the toroidal flow.

9. The plasma reactor according to claim 7, wherein the pair of polar field generators are configured so as to concentrate the current around the toroidal flow in a helical manner to maintain the toroidal flow around a center of the z-pinch flow.

10. The plasma reactor according to claim 9, wherein concentrating the current around the toroidal flow in the helical manner is achieved by providing one or more permanent magnets in each of the armature inlet pole and the armature outlet pole.

11. The plasma reactor according to claim 9, wherein concentrating the current around the toroidal flow in the helical manner is achieved by providing one or more electrical coils in each of the armature inlet pole and the armature outlet pole.

12. A method for generating kinetic energy to propel a craft using a plasma reactor, the method comprising:
   (a) adding plasma to a reactor core, the reactor core having an interior chamber and an exterior chamber and being configured to rotate within the exterior chamber;
   (b) inducing a current in the plasma using a pair of opposing polar field generators, a first polar field generator of the pair of opposing polar field generators being connected proximal to a chamber inlet of the interior chamber, and a second polar field generator of the pair of opposing polar field generators being connected proximal to an outlet of the interior chamber, wherein inducing a current in the plasma generates a toroidal flow therein and the toroidal flow compresses the plasma into a z-pinch flow in a central column between the first polar field generator of the pair of opposing polar field generators and the second polar field generator of the pair of opposing polar field generators; and
   (c) directing the z-pinch flow towards turbine blades located between the interior chamber and the exterior chamber to convert the z-pinch flow to kinetic energy.

13. The method according to claim 12, further including the step of connecting an electrical generator to an output shaft associated with an outlet of the reactor core to convert rotational energy provided by the z-pinch flow into electrical energy.

14. The method according to claim 12, further including the step of releasing plasma from the reactor core as a propellant to provide a direct source of propulsion to the craft.

15. The method according to claim 12, wherein currents induced in a first magnetic wave associated with the first polar field generator of the pair of opposing polar field generators and a second magnetic wave associated with the second polar field generator of the pair of opposing polar field generators flow in a same direction such that the first magnetic wave and the second magnetic wave interlock in the z-pinch flow to be compressed by the toroidal flow.

16. The method according to claim 15, wherein the pair of opposing polar field generators are configured so as to concentrate the current around the toroidal flow in a helical manner to maintain the toroidal flow around a center of the z-pinch flow.

* * * * *